(12) United States Patent
Branigan et al.

(10) Patent No.: US 7,496,925 B2
(45) Date of Patent: *Feb. 24, 2009

(54) INFORMATION KIT OBJECTS FOR PUBLISH/SUBSCRIBE INTEGRATION ARCHITECTURE

(75) Inventors: James Peter Branigan, Apex, NC (US); David Kenneth Lavin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 666 days.

This patent is subject to a terminal disclaimer.

(21) Appl. No.: 10/756,864

(22) Filed: Jan. 14, 2004

(65) Prior Publication Data

US 2005/0155035 A1 Jul. 14, 2005

(51) Int. Cl.
G06F 3/00 (2006.01)
G06F 9/44 (2006.01)
G06F 9/46 (2006.01)
G06F 13/00 (2006.01)

(52) U.S. Cl. .................. 719/315; 719/314; 719/319; 709/213; 709/232

(58) Field of Classification Search ......... 719/310–320, 719/328–332
See application file for complete search history.

(56) References Cited

U.S. PATENT DOCUMENTS

| | | | | |
|---|---|---|---|---|
| 5,862,325 | A * | 1/1999 | Reed et al. | 709/201 |
| 5,881,315 | A * | 3/1999 | Cohen | 710/52 |
| 5,893,911 | A * | 4/1999 | Piskiel et al. | 707/10 |
| 6,021,443 | A * | 2/2000 | Bracho et al. | 709/241 |
| 6,208,989 | B1 | 3/2001 | Dockter et al. | |
| 6,336,139 | B1 * | 1/2002 | Feridun et al. | 709/224 |
| 6,366,926 | B1 * | 4/2002 | Pohlmann et al. | 707/104.1 |
| 6,463,446 | B1 * | 10/2002 | Wollrath et al. | 707/203 |
| 6,470,351 | B1 | 10/2002 | Ahmadi | |
| 6,473,893 | B1 | 10/2002 | Kay et al. | |
| 6,609,129 | B1 | 8/2003 | Luh | |
| 7,191,180 | B2 * | 3/2007 | Evans et al. | 707/10 |
| 2002/0093857 | A1 | 7/2002 | Cole | |
| 2002/0161781 | A1 | 10/2002 | Leong et al. | |
| 2002/0165916 | A1 | 11/2002 | Kitamura | |
| 2003/0028683 | A1 | 2/2003 | Yorke et al. | |
| 2003/0081773 | A1 | 5/2003 | Sugahara et al. | |
| 2003/0115219 | A1 | 6/2003 | Chadwick | |
| 2003/0120824 | A1 | 6/2003 | Shattuck et al. | |
| 2004/0054569 | A1 * | 3/2004 | Pombo et al. | 705/7 |

OTHER PUBLICATIONS

Arslan et al, Event Library: an object-oriented library for event-driven design, Swiss Federal Institute of Technology, Oct. 22, 2003, pp. 1-10.*
Riehle, The Event Notification Pattern—Integrating Implicit Invocation with Object-Orientation, Theory and Practice of Object System, 1996, pp. 1-14.*
The Open Group, Systems Management: Event Management Service, Feb. 1997, pp. 1-112.*
Roussopoulos et al., CUP: Controlled Update Propagation in Peer-to-Peer Networks, Department of Computer Science—Stanford University; Feb. 2002, pp. 1-15.*

* cited by examiner

*Primary Examiner*—Meng-Ai An
*Assistant Examiner*—Diem K Cao
(74) *Attorney, Agent, or Firm*—Dillon & Yudell LLP

(57) ABSTRACT

An information kit object that enables generic communication patterns among components of a modular computer system environment implementing an Information Kit (advanced publish-and-subscribe software bus). The information kit object contains an identifier of the type of data contained, the actual data, and a function associated with the data and/or object. The function may be a priority value that enables the information kit object to be arranged within a queue of the information kit and issued to requesting nodes in that order. The function may also be an indicator of a level of freshness for the information kit. Object. When an object is no longer at a desired level of freshness a refresh operation is triggered, which causes the publication of another information kit object to replace the previous one. A subscription object is also provided that includes the search query listing the data object of interest to the subscribing node.

4 Claims, 7 Drawing Sheets

Fig. 1 (Abstraction)

| NODE \ SERVICE | X | 1 | 2 | 3 | 4 | N |
|---|---|---|---|---|---|---|
| | | | | | | |
| GPS 252 | | ✓** | ✓ | | ✓* | |
| TIME 254 | | | | | ✓ | |
| OTHER 256 | | | ✓ | ✓ | | |

250

* AT 10:00 PM — 258A

** SPECIFIC LAT COORDINATE 258B

| 0 | K 272 | NID 274 | E 276 | P 278 | 270 |

| 1 | KEY (K) 282 | VALUE (V) 284 | FUNCTION (F) 286 | PRIORITY (P) 288 | 280 |

INFORMATION KIT OBJECTS FOR PUBLISH/SUBSCRIBE INTEGRATION ARCHITECTURE

RELATED APPLICATION(S)

The present invention is related to the subject matter of the following commonly assigned, co-pending, and concurrently filed U.S. patent applications: Ser. No. 10/777,744 entitled "INFORMATION KIT INTEGRATION ARCHITECTURE FOR END-USER SYSTEMS"; and Ser. No. 10/756,865 entitled "ENHANCED SEARCH EXPRESSIONS FOR INFORMATION KIT INTEGRATION ARCHITECTURE". The contents of the above-referenced applications are incorporated herein by reference.

BACKGROUND OF THE INVENTION

1. Technical Field

The present invention relates generally to modular computer systems and specifically to inter-object communication for hardware and software modules in a modular computer system environment. Still more particularly, the present invention relates to effective, universal communication among different hardware and software modules within a publish/subscribe communication framework in a modular computer system environment.

2. Description of the Related Art

The technology for implementing dynamic, modular computing environment is rapidly evolving. Modular computer systems comprise a number of independent modules that are connected to and communicate with other modules within the system via some point-to-point communication mechanism. Unlike large-scale distributed computer systems (e.g., the Internet), the modules are not independent processing systems or computing devices, but are rather software applications or code that perform specific functions within the overall system environment. Additionally, the hardware components of the modular computer systems may be simple hardware instrumentation that provides input data or serves as an output device.

Typically, the modular computer system is configured with the modules being local to a processor and connected to a single computer chassis. With this configuration, specific functions can be performed by the system based on the individual applications, and additional functions can be added to the system as required/desired. Those skilled in the art are familiar with such modular computer systems and their level of expandability and/or scalability.

One example of a modular computer system is the computer system designed for modern motor vehicles. Several different types of functions are provided by different instrumentation and/or software modules, including regulating temperature, tire pressure, exhaust/fuel emissions, providing emergency services, and other general safety features. These functions require some type of interaction (e.g., sharing of data) between hardware instrumentation and software application/modules. One quickly evolving and popular function is that of providing vehicle location and navigation functionality, such as is provided utilizing global positioning system (GPS) technology.

In both the distributed computing environment and the modular computing environment, it is essential that the different components be able to exchange data effectively. However, because of the above mentioned difficulties with the point-to-point connection model, there remains a lack of full integration among all modules and hence an inability to effectively manage communication among the increasingly integrated (modular) systems.

Irrespective of the use of the system, the various programming modules, whether actual computer devices, other input/output (I/O) hardware devices, or application code, need to communicate with each other and/or at least with the operating system in a language/form that is understandable to the communicating devices. Most conventional applications connect and communicate with other modules via a point-to-point connection architecture. With this point-to-point architecture, each application has a unique set of parameters, values and formats for communicating with one of the other modules in order to provide a particular service/function.

FIGS. 5A-5C provide three representations of modular computer system operation according to the prior art. As illustrated by FIG. 5A, modular computer system 500 comprises three hardware components, a GPS device 501, temperature reader 503, and generic other device 505. Each component has a point-to-point connection to one or more of the other components, as indicated by the direct wire connections. Also, each device has an associated (first-in first-out) FIFO queue, GPS queue 502, temp queue 504, and other queue 506. The queues serve to marshal request for respective data received from one or more modules, called MOD1 511, MOD2 513, X-STAR program 515, and MODN 517. Each module issues a request for a value provided by one or more of the hardware components. The requests are queued based on order of receipt and the return data provided in the queued order. FIGS. 5B and 5C respectively illustrate the modules sending a request to the queues of the GPS tracker 501 and temperature reader 503. Notably, only a single request can be handled at a time, and all other requests must wait in the queue until the previous request has been handled.

Developers and/or manufacturers of new applications for modular computer systems tend to develop each application/module with a specific set of communication protocols that enables the module to communicate with only specific ones of the other modules in the modular computer system. A new module is connected directly (point-to-point) with another module and may only be able to communicate with that other module among the multiple modules provided within the system. Because it is common for the different modules to be developed by different manufacturers/developers, it is also very common for each module to have a module-specific communication protocol that is not necessarily understood or easily adaptable to the other modules designed by other manufacturers and/or for other systems. That is, a software module designed to operate with a first GPS system may not be able to communicate directly with a second, different GPS system that may be utilized in the same or other modular computer system.

To overcome this limitation (i.e., incompatibility among modules), manufacturers often develop the new module and then create a separate application to enable their module to communicate within a particular system. These specialized applications may be required to link the new module to the existing ones. That is, a different application may be required for each additional system in which the module may be utilized. FIGS. 5B and 5C illustrate this implementation of separate inter-module communication applications. Mainly, MOD1 and MOD2 communicate with GPS tracker 501 via a first set of request and response pairs 521A, 521B and 523A, 523B. According to the illustration, each module has a unique method of communicating with GPS tracker 501. Similarly also, is the intercommunication between the modules and temperature reader 503. Specific application code/parameters for a second set of request and response pairs 531A, 531B and 533A, 533B are provided, which may be different from those used for communicating with GPS tracker 501.

While the above methods have enabled and fostered the implementation of systems in which independently developed applications can operate and communicate within the same system. These objects can only be integrated within the system by writing specific code to tie independently developed applications together. This method is rather tedious and costly for very complex systems comprising a large number of interconnected devices and applications.

Many systems today utilize a listener pattern for integration. The listener pattern allows for objects to register interest in receiving events relevant to another object. The listener pattern requires compile time interface coupling between the event source and listeners, and the listener pattern is sensitive to bugs within the listeners. Further, utilizing the listener pattern has several additional drawbacks. Key among these drawbacks is that if the listener pattern is coded without a notification thread and queue, then each listener has the opportunity to sabotage the thread that is performing the notification by taking to long to return from the notification call. This means that to ensure that the lower level buffers are not overrun, each listener must not only be logically correct, but must also be temporally correct.

In the automobile computing environment, for example, there are several problems with conventional implementation of modular computer systems that utilize the listener pattern makes it difficult for connecting the individual application modules together. With the listener pattern, if five different applications require access to a parameter value, such as the GPS position, each application had to independently listen to the GPS device. Several problems are seen with this model. First, the modules require a point-to-point configuration. Second, only very basic (wildcard type) requests can be submitted, and matching just the basic request automatically returns the data without the ability to target specific characteristics within the system. Third, as with the example above, the applications have a compile time dependency on the GPS code.

Given the above limitations of the listener pattern and other complexities with effective inter-communication among individual application modules in a modular computer system, it would be desirable to provide a method and system that enables efficient inter-communication among the various application modules in a modular computer system environment that was more robust and comprehensive than the listener pattern. It would further be desirable if such a system enabled all modules to have equal, concurrent access to all published data of relevance within the system. A method and system that provides intercommunication among all components within an expandable modular environment utilizing without requiring special integration code for each application would be a welcomed improvement. These and other benefits are provided by the invention described herein.

SUMMARY OF THE INVENTION

Disclosed is a method and system for providing publish/subscribe functionality within a modular computer system. A new intercommunication architecture and associated protocol called the Information Kit is provided. The Information Kit is a publish-and-subscribe software bus applied as an application programming model on an embedded device. The connection model includes bus connection functionality for connection, notification, and publication procedures.

Each module of the modular computer system is connected to a virtual node on the information bus and each node operates as a subscriber/listener to the entire software bus. During set of the module, the module provides a request to the Information Kit. An information kit manager (processor) logs the request in a register of available functions. Data (or information) is published by devices connected to other nodes of the Information Kit, and the data is placed in a queue for publication to the requesting nodes. The information manager notifies the modules of the availability of the data implements a directed broadcast of the data to the modules requesting that particular data. Communication between subscribing nodes and publishing nodes is thus completed via the information manager.

According to one embodiment of the invention, the published data and subscription requests are completed via information objects. These information objects are designed with a key and a value. The key identifies the type of object, while the value is the request expression for subscription objects and the actual data for published objects. The similar/generic format of the objects enables interaction among all different types of modules and devices connected to the Information Kit without specialized applications and or individualized formats for communication between any two components.

In one embodiment, the published information objects may also comprise a priority value, which is utilized to prioritize the objects within the queue. Higher priority objects are therefore sent to the requesting modules ahead of lower priority objects that concurrently occupy the queue.

Subscription information objects are provided by the modules using either simple or complex search expressions. The nodes are provided with a specially formatted dictionary of expressions. These expressions may comprise simple data requests or more complex requests that includes logical expressions and/or conditional expressions, etc. Thus, a more detailed search expression structure/method is provided. When the logical (or conditional) expressions are utilized within a subscription, the published data is provided to the requesting module only when each requirement within that expression is met.

One embodiment of the invention provides enhanced agent functionality. Intelligent software agents are provided with a clearing-house of information that is required for the agent technology to operate efficiently. The agent may be written to simply listen to published information and in turn publish information on the information bus. In this way, software agents may be added incrementally to the overall system, without requiring modifications to the code of the new software agents or to the existing agents. The invention also enables the combination of application modules and interchangeability among modules. A single module may be replaced by another module or a combination of modules.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2B illustrates a sample registration table by which the various modules/nodes register with the IK manager according to one embodiment of the invention;

FIG. 2C is a block diagram representing a subscribe information object and a publish information object according to one embodiment of the invention;

DETAILED DESCRIPTION OF ILLUSTRATIVE EMBODIMENT(S)

Figure 1:
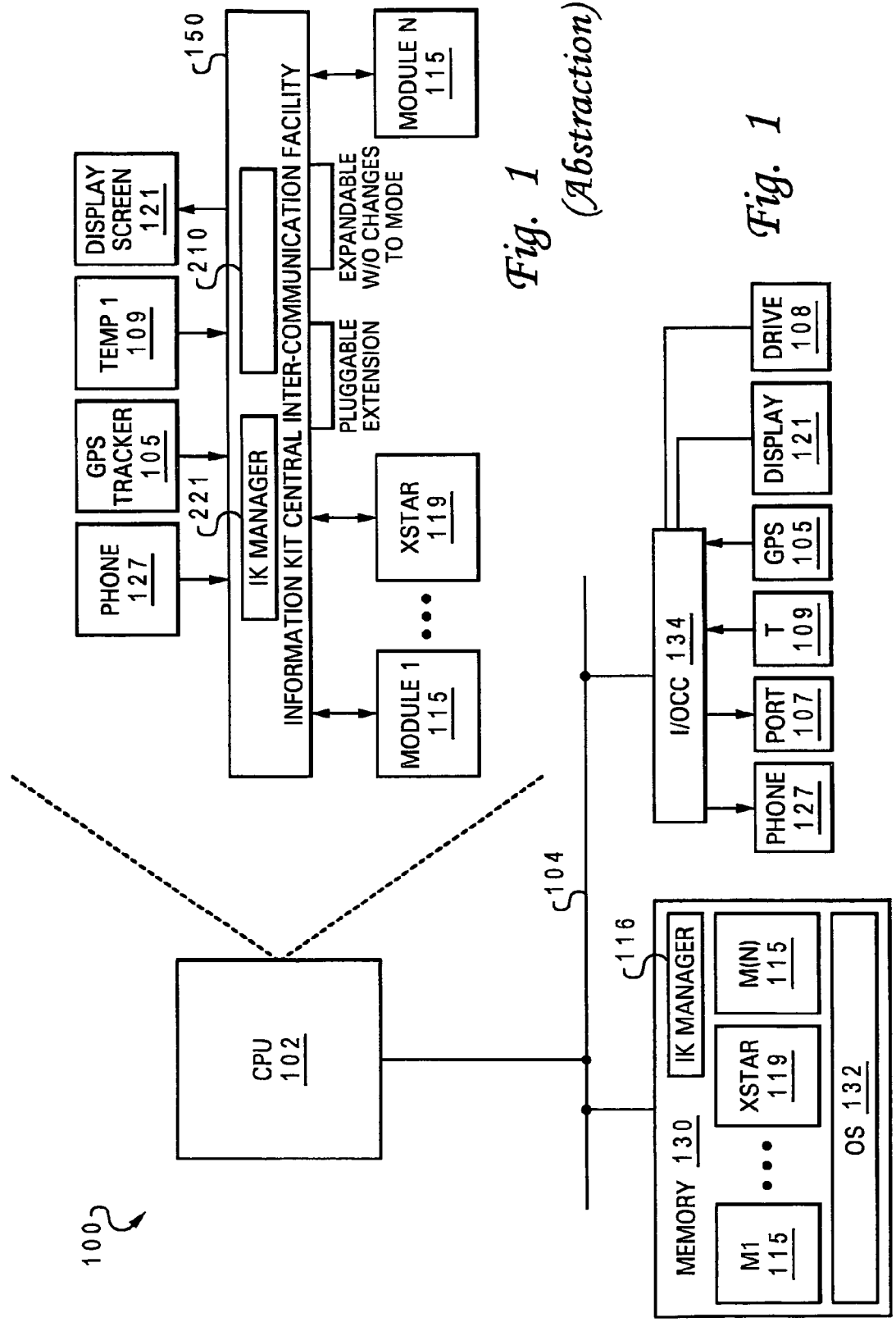
FIG. 1 is an exemplary block diagram of a modular computing environment in which the present invention may be implemented.

The present invention introduces a new intercommunication architecture and protocol (i.e., publish and subscribe software bus) called the Information Kit (IK) that is applied as an application programming model on an embedded device. The IK connection model provides a new design for universal inter-module communication that includes novel connection, notification, and publication procedures.

The description of the invention is divided into five major sections labeled with Roman numerals I-V. Several of the sections contain one or more subsections labeled alphabetically (A, B, etc.). Section I provides a general overview of the MQ publish/subscribe paradigm. Section II introduces the concept of Agents and Agent technology, which is greatly enhanced by the features of the present invention. Section III provides an introduction and description of the Information Kit and the three major functions of subscription (connection), publication, and notification. Following the discussion of the Information Kit, subsection E provides an example of the operation of the Information Kit based on the illustrative embodiment of FIG. 2. Section IV then introduces the Information Object followed by Section V which describes the Information Kit Search Expressions.

I. Publish/Subscribe Paradigm: (MQ, MQi, And Distributed Systems)

In order to obtain a complete understanding of the invention, a general understanding of the publish/subscribe communication paradigm is required. IBM Corporation's MQSeries and WebSphere MQ family of messaging products are examples of commercially available "middleware" products which support interoperation between application programs running on different systems in a distributed (non-modular) heterogeneous environment.

The message queuing inter-program communication support provided by the MQSeries products enables each application program to send messages to the input queue of any other target application program and each target application can asynchronously take these messages from its input queue for processing. This achieves delivery of messages between application programs which may be spread across a distributed heterogeneous computer network, without requiring a dedicated logical end-to-end connection between the application programs. Also, there can be great complexity in the map of possible interconnections between the application programs.

This complexity is greatly simplified by including within the network architecture a communications hub to which other systems connect, instead of having direct connections between all systems. Message brokering capabilities are then provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Message brokers in larger distributed networks, such as the Internet, support a publish/subscribe communication paradigm for these distributed systems. This paradigm involves a set of one or more publishers (e.g., background merchants with web servers) sending communications to a set of one or more subscribers (e.g., users of clients) who have registered their interest in receiving communications of that type. Publish/subscribe methodology allows subscribing users to receive the very latest information in an area of interest (for example, stock prices or events such as news flashes or store specials). The publish/subscribe environment has a number of publisher applications sending messages via a broker to a number of subscriber applications located on remote computers across the network.

The subscribers notify the broker(s) of the message types they wish to receive and this information is stored at the broker. Publishers send their messages to the broker, which compares the message type (for example, checking message header topic fields and/or checking message content) with its stored subscriber information to determine which subscribers the message should be forwarded to. The message broker may perform additional functions, such as filtering, formatting or otherwise processing received messages before forwarding them to subscribers.

The invention extends the model of a publish-and-subscribe software bus, developed for application within large-scale distributed systems under MQi, to a robust, modular arena within a single computer system. However, the specific implementation of the publish/subscribe method to a modular computer environment with embedded clients, each having different functional interactions, distinguishes the invention from other large distributed systems such as MQ.

II. Agent Technology

The invention extends the model of a publish-and-subscribe software bus, developed for different applications under MQi, to a robust modular arena within a single system. In the illustrative embodiments, the software bus is provided as an application programming model on an embedded device. The application programming model is implemented on a client platform.

In one embodiment, the invention may be described as a software method for enabling seamless operation of Intelligent Agents (IA) within an agent-to-agent communicative environment. An agent is a software-coded utility that performs specific functions within a larger system environment.

Agents are described as smart/intelligent when the agent is able to interact with the system and re-act to the presence/occurrence of particular triggers on the system by completing the function the agent was designed to complete. Thus, the IA is essentially an application that does not merely collect data and/or publish information for consumption.

Previous implementations of IAs have been hindered by the inability to provide a plug-and-play" type functionality for each agent. As described in the background, adding new agents (or application modules) typically requires additional code that was application specific. The new application module would then be restricted to communicating/interacting with only specific devices and/or other applications in the overall system. The technology has not provided the robustness desired for expanding the use of IAs to a modular computer system environment.

The implementation of the Information kit provides a breakthrough for agent technology that is currently being developed. One of the central problems of agent technology has been allowing the agent access to information that is internally protected by the vertical application stacks that pervade today's application architectures. For example, with current implementation, an agent that needed access to email, GPS information, and a billing system to perform some task would have to be interfaced to each application individually to gain access to the necessary data. The invention overcomes this limitation by providing a model where the information is publicly available, all in one location.

Utilizing the various communication enhancements (described below) provided by the information kit enable further expansion of agent technology into the modular computer system environment. The agents are provided with a clearing house of information that is required for the agent technology to operate efficiently. Additionally, an agent may be plugged into the system without restrictions on its ability to communicate/interact with other devices/agents/application modules. Within the information kit model, an agent is simply written with code to listen for the necessary information, and the agent is provided complete access to a bus where that information is published and all other communication is transacted. In this way, agent functionality may be added incrementally to the overall system, without requiring modifications to the agent or the existing devices/application modules.

A. Generic Example of Agents

As implemented by the invention, an agent obtains reference to the information bus in order to achieve connection. The agent then registers interest in pieces of information using expressions. Following the registration, a notification is completed by the bus processor, which looks at the piece of information, determines how to handle the information, including whether or not to publish out the information (if required).

An example of the functional implementation of the invention utilizing the information kit and agent technology is now provided. The example describes the interaction of the modules required for detecting and responding to an Engine Overheating at the information bus. There are three agents on the bus in this example: (1) Engine I/O Agent; (2) Diagnostics Agent; and (3) User Manager Agent. The Engine I/O Agent only publishes information. This agent listens to the vehicle for diagnostic information, such as engine temperature. Whenever the Engine I/O agent hears diagnostic information from the vehicle, the agent publishes a piece of information on the bus that contains the diagnostic values.

The Diagnostics Agent listens to information that contains diagnostic values. When the Diagnostics agent hears such information, the agent performs range checking and other advanced diagnostic work. If a value is out of range, the diagnostics agent publishes a notification that indicates that the engine is having a problem. The User Manager Agent listens to all information that the user might want to know about. This information includes Engine problem reports. When the Diagnostic Agent publishes such a report, the User Manager Agent notifies that user of the problem.

III. Information Kit (Ik)

As described and claimed, the invention provides a method and system for modeling the design of a modular computer system around a publish and subscribe software bus, referred to hereinafter as the Information Kit, and applying the software bus as an application programming model on an embedded device. From a processing standpoint, the invention provides a connection model that comprises three primary processes, (1) a connection (subscription) process, (2) a publication process, and (3) a notification process. The implementation of each of these processes is unique to the invention. None of the known conventional methods/systems provide a connection model that includes any one or a combination of one or more of the three processes. Each of these processes is best described with reference to the figures and particular with reference to FIGS. 1 and 2 described below.

The illustrative embodiment of the invention is described with specific reference to applications (which are interchangeably referred to as agents throughout the description) within automotive computing modules and GPS functionality. This modular environment is conventionally designed to interact utilizing a listener pattern, which, as described in the background section of the application, includes a number of limitations. The Information Kit introduces a connection model that overcomes each of the limitations and provides a design with even looser coupling than the listener pattern, which is advantageous to modular computer system environments.

A. Hardware Considerations For IK Implementation

FIG. 1 provides a high level block diagram, which illustrates one view of the Information Kit implemented within a modular motor vehicle computer system. Several hardware components/devices and software modules are illustrated both in a standard data processing system configuration and in a virtual Information Kit configuration, which is indicated as an abstraction (view from the processor) of the intercommunication among the modules and components.

The hardware components of FIG. 1 include processor 102, memory 130 and input/output (I/O) channel controller (CC) 134 coupled to each other via interconnect 104. Interconnect 104 is a wired bus that may comprise multiple wires that run between the various components.

Connected to I/O CC 134 are various devices (i.e., instrumentations) of the modular (automobile) system 100. Among these devices are telephone 127, temperature gauge/thermometer 109, GPS locator 105, and display 121. Also illustrated is port 107 by which expansion of the modular computer system to include other devices, etc. is provided and Disk/CD drive 108 that enables expansion of the modular computer system's application modules by installation of new software applications.

Within memory 130 are various software components that may be executed on processor 102 to provide particular applications and/or services (referred to herein as application modules and/or agents). Among these software components are an Operating System (OS) 132, modules M1 through MN 115 and Xstar program 119. Also included within memory is Information Kit manager 116, which directs the communication interchange within the Information Kit. The modules and other software applications represent stand-alone program applications that, when executed by processor, completes some function within the overall modular computer system. Xstar program 119 is an exemplary agent that provides vehicle location and direction mapping features utilizing GPS. Xstar program 119 is individually identified to provide a concrete example of the operation of the intercommunication among modules via the Information Kit.

Those of ordinary skill in the art will appreciate that the hardware/software configuration of FIG. 1 may vary depending on the implementation. Other internal hardware or peripheral devices may be used in addition to or in place of the hardware depicted in FIG. 1. Also, the processes of the present invention may be applied to a multiprocessor data processing system. The depicted example in FIG. 1 and those of other figures described below are not meant to imply architectural limitations to the invention.

B. Connection, Subscription, And Registration Processes

As shown by the abstraction of FIG. 1, the information kit 150 is implemented as a virtual bus on the processor with a plurality of nodes at which each application module/agent and hardware device is connected. Accordingly, each agent is connected to a virtual node on the information kit 150 and each active node operates as a listener to the entire software bus for the connected module. The individual nodes do not require any knowledge of other nodes.

Communication with the Information Kit is completed by having the nodes subscribe and/or publish utilizing specially formatted dictionary objects (described below) to the bus. The objects themselves may comprise certain expressions that define either the object or the specific set of published data being requested by a subscription.

The modules that are intelligent agents (i.e., those that utilize the published information to complete some greater function) may be considered "consumers" while others (who merely receive the published information) are considered "listeners" on the information kit. The subscription by a module occurs once per node, and subscription is usually completed during a first activation of the module at the node. However, subsequent activation of the module may be provided that triggers a new subscription of the module and assigning of registration within the registration table.

According to the illustrated embodiment, a node connects the module to the Information Kit and a subscription object is generated by the module. The subscription objects are placed by the modules on the information kit to enable the module/agent to register its desire for access to specific type of data with the information kit (IK) manager (or processor). Each subscription is registered with the IK manager, which handles the notification and forwarding of requested data to the respective subscribers.

With reference now to FIG. 2B, there illustrates a sample registration table by which the various modules (represented by their respective nodes) register with the IK manager for receipt of specific ones of the information or data related to the services provided within the Information Kit of the modular computer system. The illustration provides registration data for three services, including GPS coordinates 252, a Clock-time 254, and "other" 258.

Subscription is completed via a single subscription format. However, as indicated, some nodes (agents) may register with a general request for a particular data while other nodes register with more specific requests for the data. As will be explained in greater details below, a general request is provided the data whenever the data is published, while the specific request may only provide data upon an occurrence of one or more conditions in addition to the publication of the data. According to the illustrative embodiment, the agent at node 2 registered generally for receipt of published GPS data, while the agent at node 4 registered for GPS data with a delimiter 258A of a specific time (10:00 PM) and the agent at node 1 registered for GPS data when the data includes a specific latitude coordinate 258B.

C. Publication

Generally, for most devices, the publication object is published at some a pre-established (pre-programmed) interval. For example, an updated GPS coordinate may be provided every 5 seconds. In another embodiment, the publication may occur based on measured changes in the service being monitored. For example, an update GPS coordinate may be provided only when the vehicle movement changes the coordinates by a preset amount. Thus, a stationary vehicle would not have published GPS coordinates cluttering the Information Kit. Publication may occurs based on some trigger from the Information manager that requires either (1) publication of data to satisfy a new request for that data (when a new module is connected or a module is updated) or (2) publication of more current data when the data within the queue is determined to be stale (as described below).

Finally, publication may occur based on an agent's receipt of a notification. For example, an agent may register interest in an engine overheating condition. Then, whenever a notification about detected engine overheating is received, the agent prepares a publication object with current temperature data and publishes that object. When publication occurs as a response to a notification, the information to be published is simply placed on the information kit. When publication occurs independent of a notification, (i.e., without an external trigger), the processor obtains reference to the information bus and the piece of information is published onto the bus in some pre-programmed order.

Publication is completed using a single publication data format defined by the information kit. All published data is provided in a single universal format and all consumers (IAs) and listeners receive and are able to understand the data in that format. This single format implementation enables multiple different types of subscribers and producers to interact without proprietary code (or applications) linking one to the other. The device publishing the data generates a publication object that includes an identifier that distinguishes the object from other objects being published by other devices. The data and other information are placed in pre-established locations within the publication object. Additional information, such as a time stamp, may also be provided within the object. Once all the relevant information is included, the object is forwarded (published) on the Information Kit. The IK manager monitors when new objects are published to the Information Kit and places those objects within a central queue (or clearinghouse) for the system.

Priority Considerations

When the data is published, the data is sent to the central queue. In the illustrative embodiment, published data is arranged within the central queue according to priority value (P). Any priority scheme (e.g., high, low, medium, etc.) may be utilized for a system in which a direct FIFO (first-in first-out) queue is not provided. Thus, if recently published data is tagged as high priority data and a previously published data still in the queue is tagged as low priority, the recently published data is moved ahead of the queue by the IK manager. The IK manager reads the priority values from the IK object and arranges the objects (for notification and delivery) according to the relative priorities of each object within the queue.

When the object reaches the top of the queue, the nodes that registered an interest in that object are sent a notification that the information object is available. The modules that registered to receive the information/data receive the information transmitted from the queue via directed broadcast. In one embodiment, notification occurs as soon as the information object is published. This enables agents to receive immediate notice of the publication and respond accordingly.

D. Notification

Once the objects are published, the IK manager issues a notification to the respective nodes that subscribed (or registered) for the specific data. Those nodes that have specific criteria associated with the subscription are only notified when the criteria is met. For example, if the GPS coordinates are to be provided only at 10:00 AM, the module issuing such a subscription request only receives a notification for GPS coordinates received at 10:00 AM. Other modules that registered generally or with some other criterion may receive notification of each GPS coordinates published to the Information Kit.

In one embodiment, the notification serves to alert the node that the data is forthcoming. The node responds by clearing itself for receipt of the data. Depending on the module connected to the node, this clearing of the node may involve setting of a flag to prevent other unwanted data from being received, activation of the listener mode to enable receipt of data being broadcasted on the Information Kit, holding off processes at the module until the data is received, etc.

The information kit may also provide notification based on the order within the queue so that only modules registered to received objects that are close to the top of the queue (i.e., about to be broadcasted on the Information Kit) are notified. This facilitates "set node to receive mode" functionality.

Once the notification has been sent to the nodes, the objects are broadcasted to the specific ones of the registered modules. Although a directed broadcast is described, the invention is capable of being implemented with a general broadcast of both the notification and the published data.

E. Specific Example

Figure 2A:
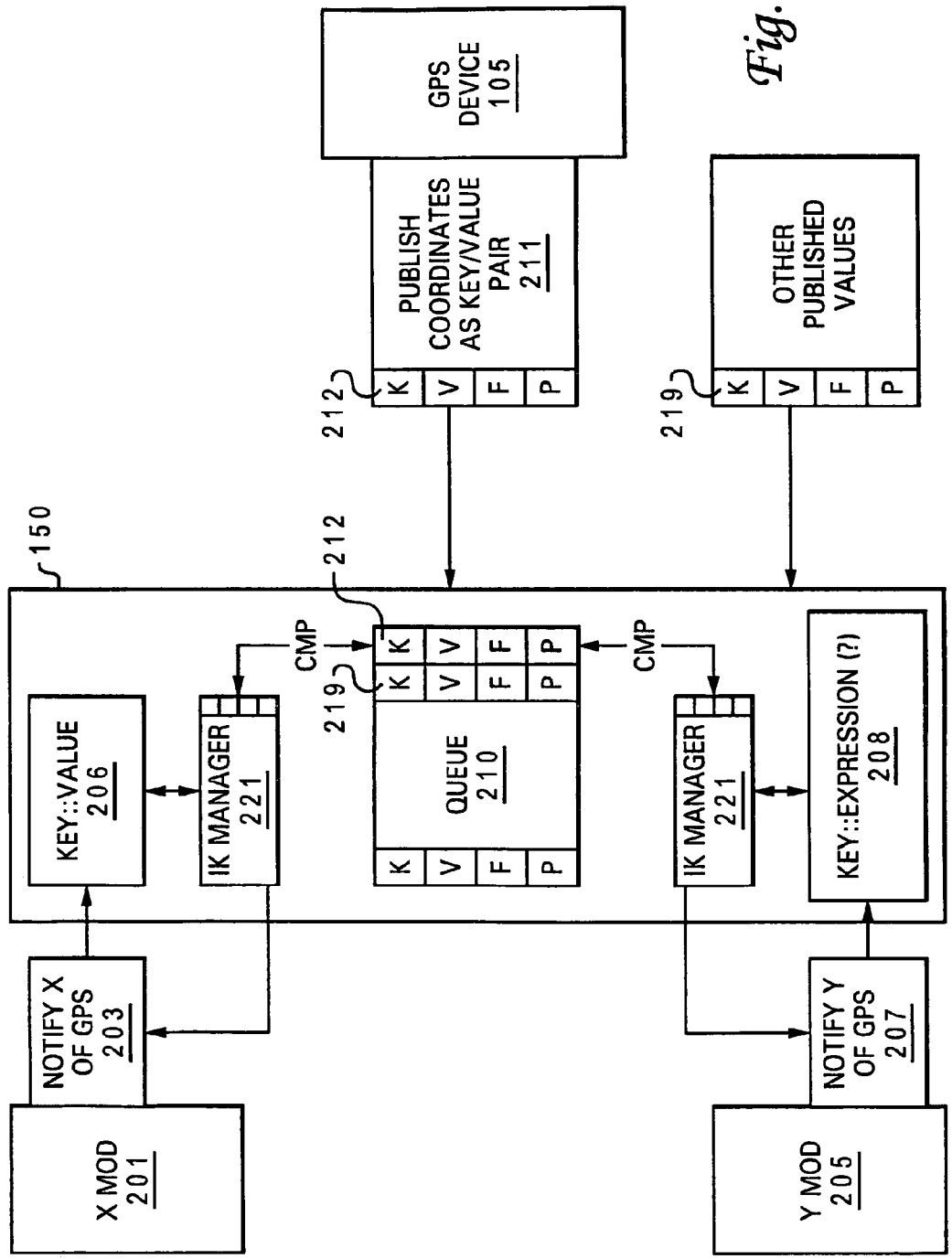
FIG. 2A is a block diagram depicting key-value objects being utilized to transact communication among modules of the modular computing environment of FIG. 1 with an information manager according to one implementation of the invention.

FIG. 2A is a block diagram illustrating the utilization of information kit objects (as agents and published information/data) to enable inter-communication among different modules/agents and data producing (hardware) components via the information kit. Two different modules/agents, module X 201 and module Y 205 are illustrated coupled to Information kit 150 along with GPS device 105. Subscription objects generated by each module, i.e., module X's GPS subscription object 203 and model Y's GPS subscription object 207, are placed on the information kit 150. These subscriptions are represented as information kit objects 206 and 208, respectively. GPS location data provided by GPS device 105, i.e., GPS coordinate 211, is also placed on (or published to) information kit 150 at some programmed interval. The published GPS coordinates 211 are represented within information kit 150 by information kit object 212. Other published data are also provided by information object 219, which is sent to the information kit 150 and placed in the queue 210.

When a node, such as GPS device's node, publishes new information object on the software bus, the information object is added to a queue of information objects that will be sent to interested nodes, e.g., nodes of X module 201 and Y module 205. The information object will be removed from the queue and sent to interested nodes based on the priority of the information object. Thus, the IK objects 212 and 219 are placed within system queue 210. System queue 210 is a priority queue that operates as a priority-based FIFO. That is, the information objects are placed in the queue and arranged according to priority. Once arranged, the objects with the same level of priority are sent to the requesting nodes in the order in which the objects arrived at the queue 210.

IK manager 221 matches values of the published object 212 against the key and expressions from each of the registered nodes. For example, the keys in the subscription objects are compared against the keys in the published object 212. If a match occurs, the node is notified of the Information object and provided with a fresh copy of the information contained therein. In another embodiment, once the nodes register with the IK manager, the IK manager simply checks the incoming published information object to determine which nodes registered to receive the information. The IK manager then addresses the information object to the interested nodes. A directed broadcast of the information object is later completed, whereby those nodes interested in the information object simultaneously receive the information object.

In one embodiment, specific ones of the nodes also comprise a local queue to enable the received information to be held until the data are assimilated or utilized by the module. As an example, a text-to-speech agent (module), which requires a long time to process each speech request, would be designed with a queue at the node.

F. Subscription Response

Figure 4:
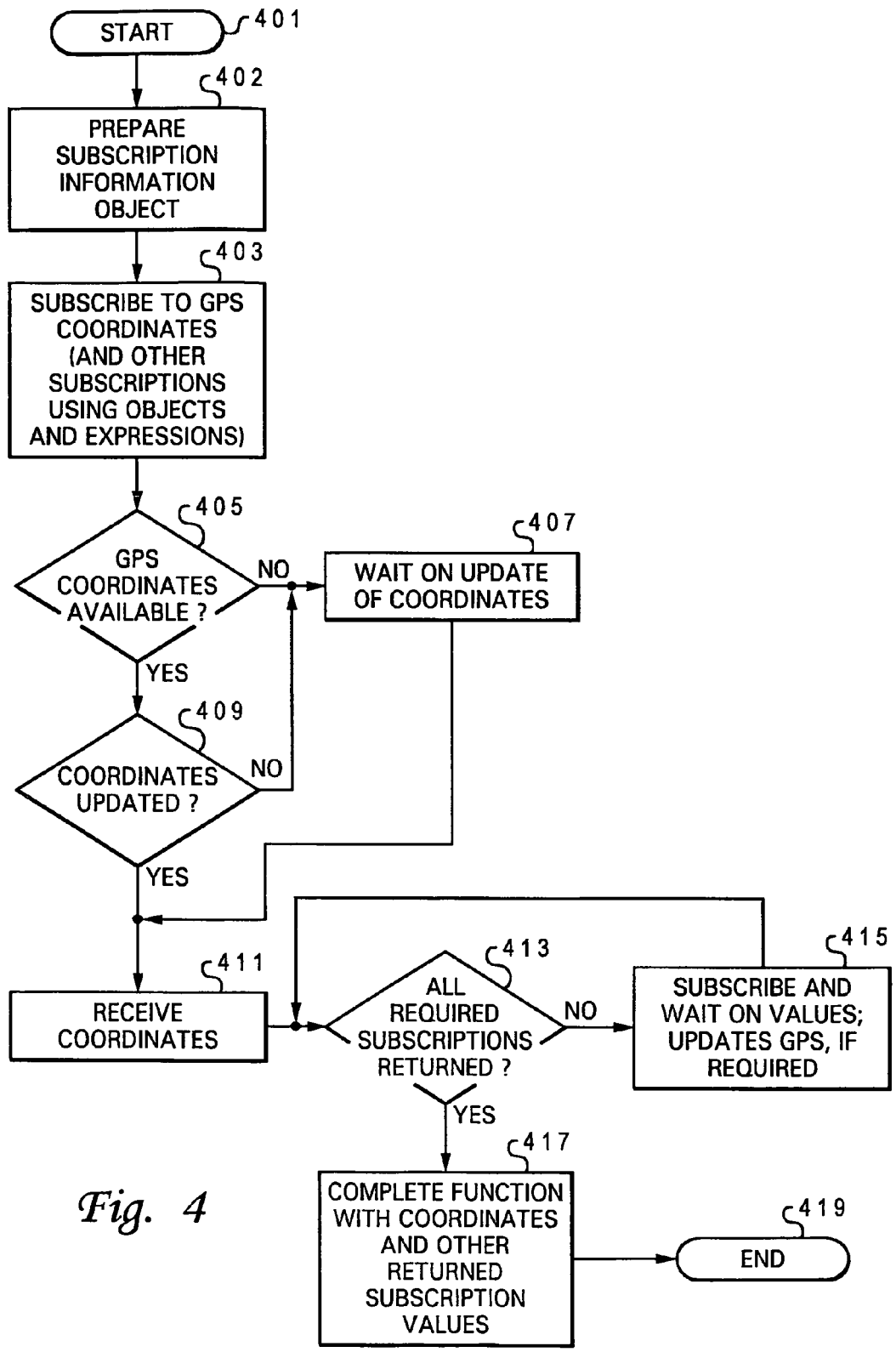
FIG. 4 is a flow chart depicting the process by which a program module interacts with the Information Kit via publish/subscribe methods according to one implementation of the invention.
Figure 5A:
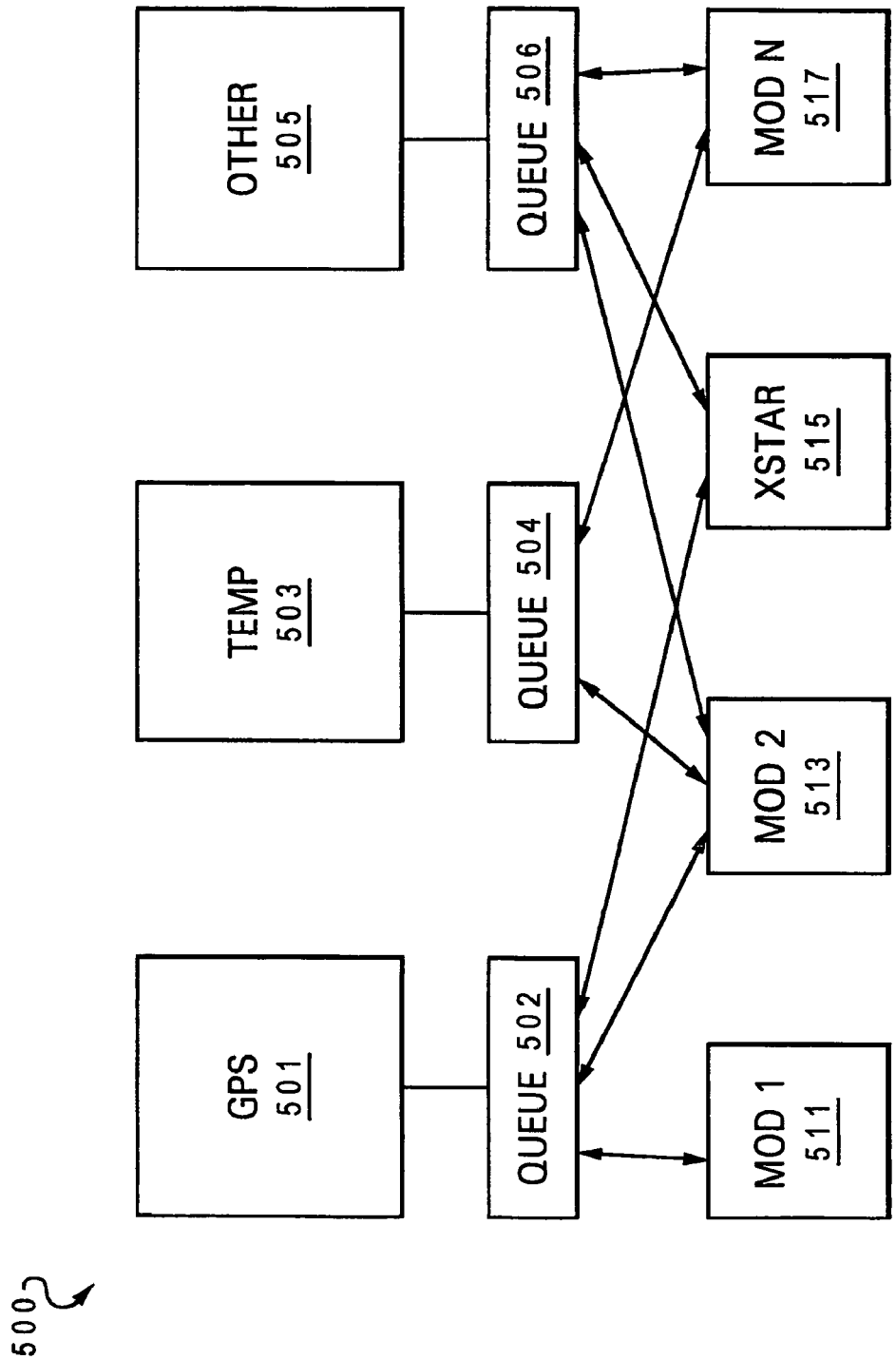
FIGS. 5A-5C are block diagrams illustrating prior art methods of inter-module connection and communication within a modular computer system.
Figure 5B:
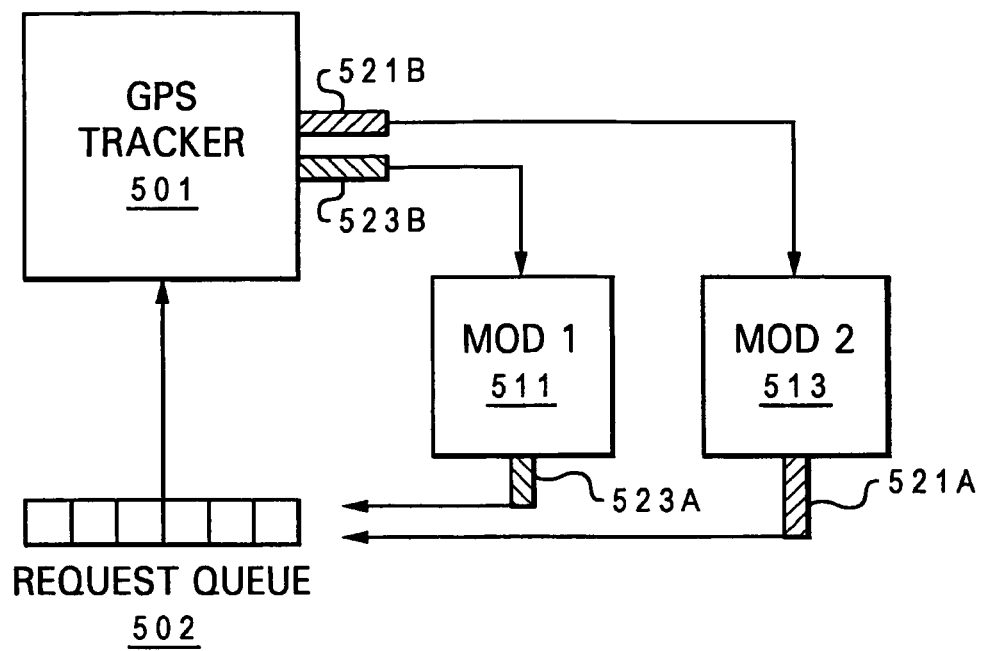
Figure 5C:
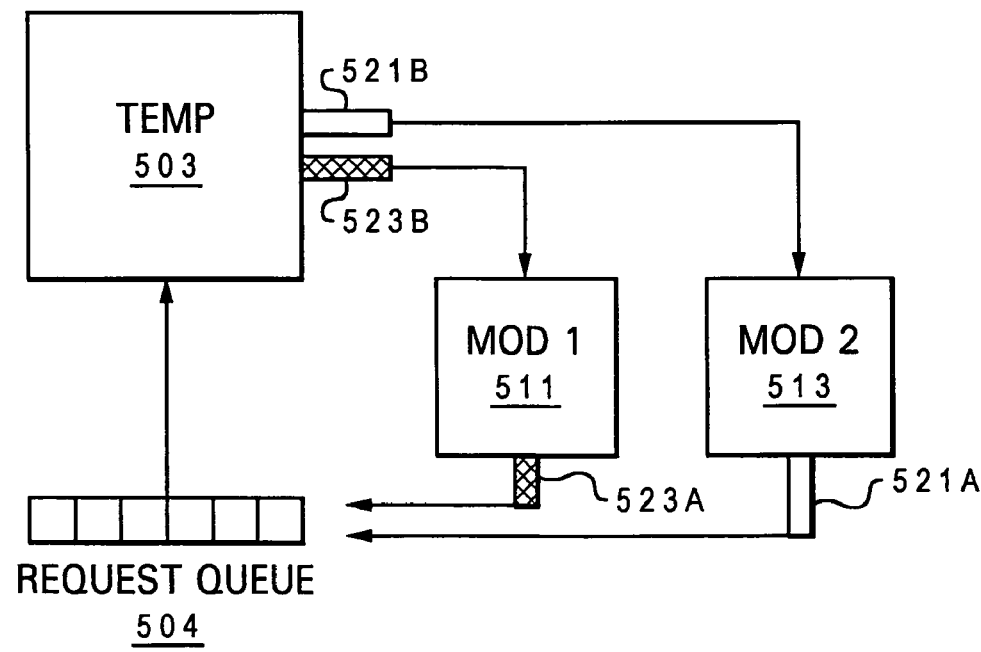

With reference now to FIG. 4, there is illustrated a flow chart of the processing of subscriptions by Information Kit from the perspective of a subscribing agent/node. The process begins at block 401 and then proceeds to block 402, which indicates the preparation of an information object for subscription purposes. Then, as shown at block 403, the information object is placed as a subscription on the information kit. A check is made at block 405 whether GPS coordinates are available within the queue (of the Information kit). If GPS coordinates are not available, the IK manager registers the request and waits until the GPS coordinates are made available (or updated to the queue) as shown at block 407.

Once the coordinates are available, another check is made at block 409 whether the coordinates are current (fresh) or were recently updated. Assuming the coordinates are available and current, the subscriber is sent the coordinates as indicate at block 411. Depending on the specific implementation, a next determination is made at block 413 whether all requested subscriptions have been returned to the node. This check is required when more than one set of information is required to complete a function of the requesting module.

When all the required subscription data have not been returned, the module waits until those other values are returned, as shown at block 415. Regular updates to the returned values are received while the module waits for responses to the other subscriptions. When all the required subscriptions have been returned, the module completes its function utilizing the values received from within the information objects as stated at block 417. The process then ends as shown at block 419.

IV. Information Objects

According to described embodiment of the invention, the published data and subscription requests are completed via information objects. These information objects are designed with at least a key and a value. The key identifies the type of object, while the value is the request expression for subscription objects and the actual data for publication objects. The similar format of the subscribe and publish information objects enables interaction among all different types of modules and devices connected to the Information Kit without specialized applications and or individualized formats for communication between any two components.

As described above, in one embodiment, the published information objects (publication objects) may also comprise a priority value, which is utilized to prioritize the objects within the queue. This enables the higher priority objects to be sent to the requesting modules ahead of lower priority objects that concurrently occupy the queue. FIG. 2C provides block diagram representations of a subscribe information object and a publish information object. Subscribe information object (subscription object) 270 comprises a key 272, which identifies the service for which the subscription is being made, a node identifier (ID) 274, which identifies the node/module issuing the subscription, and search expression 276, which may or may not contain information depending on whether the node has particular criteria affecting the subscription.

The subscription objects are provided by the modules using simple or complex search expressions. The nodes are provided with a specially formatted dictionary of expressions. These expressions may comprise simple data requests or more complex requests that includes logical expressions and/or conditional expressions, etc. Thus, a more detailed search expression structure/method is provided. When the logical (or conditional) expressions are utilized within a subscription, the published data is provided to the requesting module only when each requirement within that expression is met.

Based on the implementation, subscription object 270 may comprise a priority field 278 to indicate the level of priority to assign to that subscription among multiple subscriptions provided by the same node or other nodes. Also, included within subscription object 270 is an object differentiator bit 271. This bit is set by the node and/or the device publishing the publication object and, according to the described embodiment, informs the IK manager whether the object seen on the Information Kit is a subscription object 270 or a publication object 280. Although illustrated as the most significant bit in the objects, object differentiator bit 271 may not necessarily be the most significant bit, and the IK manager is designed to recognize which bit is assigned as the object differentiator bit. Notably, in another embodiment, no such bit is required as the subscription object is differentiated from the publication object by some other mechanism. For example, the subscription object 270 may be much smaller in size than a publication object 280 or the subscription object may simply be recognized as such because it contains an NID 274.

According to FIG. 2C, publication object 280 also comprises an object differentiator bit 281 and a key 282. Publication object 280 also comprises a value field 284, a function field 286, and a priority field 288. Value field 284 stores the data/information of interest to be published. Function field 286 is a miscellaneous field that may include refresh functionality, described below, and/or other functionality desired to be associated with the published data (or publication object 280). Finally, priority field 288 stores the value of the relative priority of the publication object 280 as assigned by the device issuing the object or programmed by a system developer/designer.

Each information object contains a set of keys with matching value objects, and each key is a string. In one embodiment, the matching object is a commonly known object type (e.g., String, Integer, etc.) and represents some information piece of information. For example, the current latitude or longitude could be keys in an information object. Also, all the values within a single information object are consistent. For example, the latitude and longitude values are both from the same timeframe.

The above described Information Kit objects are key components for the implementation of the Information Kit. The information objects are designed with several capabilities that are unique to the publish-and-subscribe programming model of the invention. Using these objects, the invention provides a solution to the problems of modeling data in a software bus in such a way as to reduce coupling between modules sharing the data. The invention introduces the information objects, which are messages by which publish and subscribe software bus passes around information. Within the Information Kit all data is modeled as a set of keys having matching values, and the information kit is designed to support modeling data in a software bus with these information objects.

Dynamic Refresh

In one implementation, the Information object is provided with the capability to monitor and be aware of its level of freshness. This may involve some sort of timing mechanism, whereby the information is no longer fresh after a predetermined period of time has elapsed since the information object was placed in the queue (or on the Information Kit). In another embodiment, the IK manager tracks the elapsed time since publication of an object. In either implementation, if a publication object becomes too stale (expires) while waiting for dispatch, the publisher is message to provide an updated information object. In one embodiment, the information object is always checked for its level of "freshness" and refreshed/updated before the information is sent to the interested nodes. The stale information object is removed from the queue and not forwarded to the subscriber(s).

As an example of this operation, GPS receiver 105 continually sends out GPS coordinates. The application(s) (X and Y modules) that need GPS coordinates most probably require the most current (updated) position. Prior to providing the GPS coordinates to a registered node, a refresh operation is automatically called/initiated, and the current value of the GPS coordinates within the queue is discarded and replaced with the updated value that was most recently published.

Thus, whenever the object is to be sent to a requesting module, the information object is first allowed to refresh the information before the information is sent to the interested nodes. According to one embodiment, the information object is also designed with the functionality required to enable it to provide the interested nodes with an indication of its level of freshness. Neither of these two functional features is available with conventional data structures.

Figure 3:
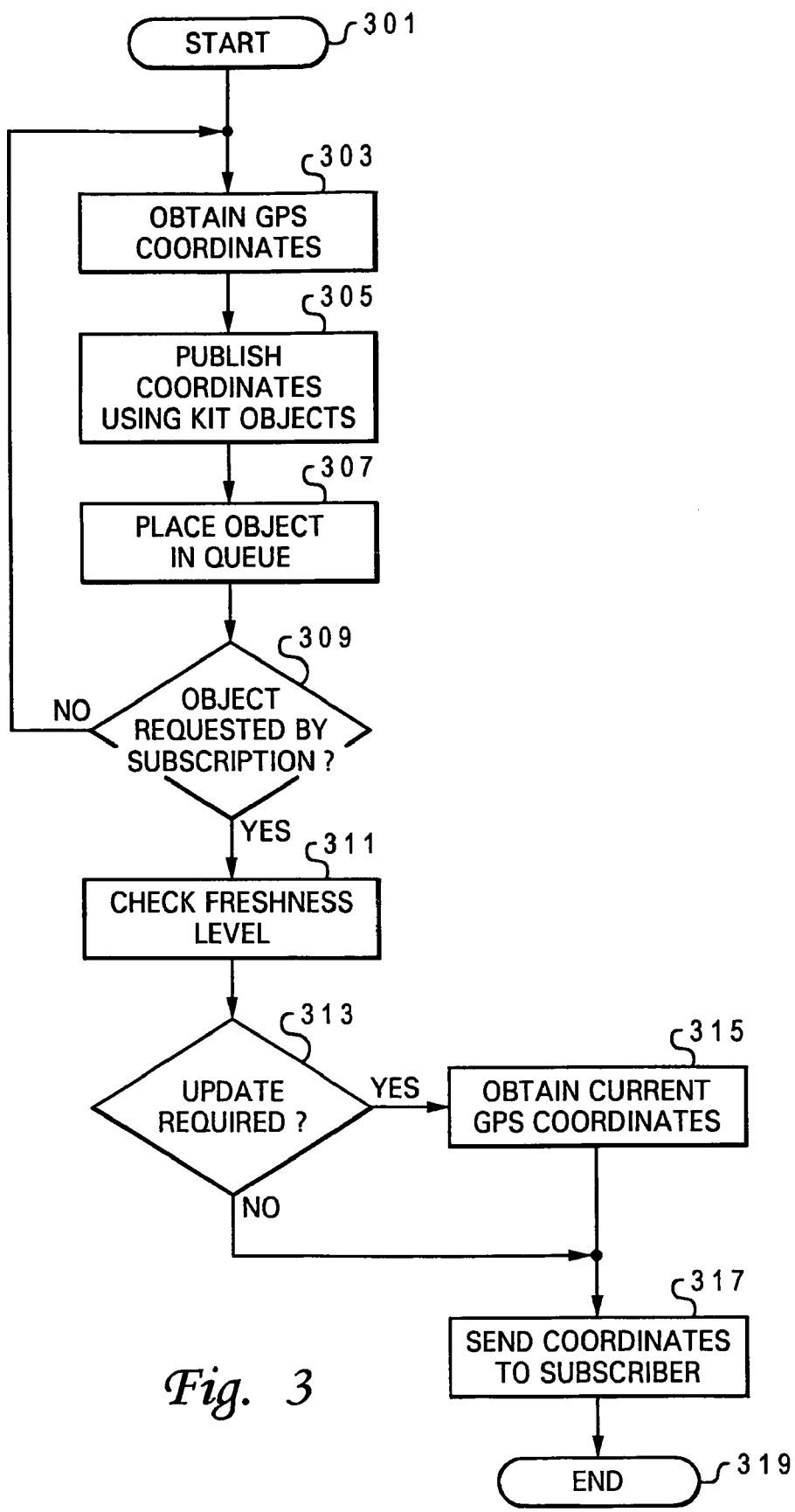
FIG. 3 is a flow chart depicting the process by which the GPS coordinates are obtained by a monitoring device and published to the Information Kit using information objects according to one implementation of the invention.

FIG. 3 provides a flow chart illustrating one embodiment of the process of publishing information objects and refreshing information contained therein, if/when required. The process begins at block 301 and thereafter proceeds to block 303, which indicates the GPS device obtaining the current GPS coordinates. The coordinates are published to the Information Kit utilizing the information object format as shown at block 305. Then as described at block 307, the information object is placed in a queue. A determination is made at block 309 whether the information object is required by a subscription request. If the information object is required, a check of the level of freshness of the information object is made at block 311 and a next determination made at block 313 whether an update (or refresh) of the information is required. If an update is required, the new/current GPS coordinates are obtained at block 315. Then, the newly obtained coordinates are forwarded to the subscriber(s) as indicated at block 317. The process then ends at block 319.

V. Information Kit Expressions

Along with providing a special information kit object by which communication among modules are completed, the invention also introduces a unique subscription method by which searches are provided much more flexibility. The information kit provides the infrastructure within which subscriptions may be created utilizing a Boolean-type expression and associated mechanism for providing pattern matching for the expression objects.

As previously mentioned, subscription objects may comprise a simple query that registers for receipt of the data or a more complex query utilizing expressions that allows the node to register for specific types of the data. By implementing the Information Kit expression, the invention provides a yielding of higher efficiency on matching operations, creating the expression objects, and using the pattern expressions in lieu of wildcard matching. Expression objects are registered with the information kit from a node. The expression object is passed instead of a wildcard string in order to provide a richer set of options for a node on the information bus.

Wildcard patterns are commonly utilized for searching within loosely coupled systems, such as a modular computer system. When performing a search, it is common to use wildcard characters, such as "*" and "?". Interest is registered in a variable formatted string and pattern matched searching is provided. When creating a wildcard expression, the creator is essentially saying that he wants to see all strings that match the expression. This conventional technique is extremely restrictive.

Thus, within the Information Kit, pattern expressions are used in lieu of wildcard matching. The utilization of pattern expressions adds power and provides for better efficiency, and the expression mechanism provides a much more powerful and expressive capability to the programmer than wildcard characters. The invention thus introduces a powerful matching tool that is more powerful that wildcard based pattern matching.

Specifically, the invention provides Information Kit expressions, which can be ANDed and ORed together, unlike conventional wildcards. The functionality of Information kit expressions thus enables/yields much higher efficiency on matching operations within a modular subsystem implementing publish and subscribe methodology.

Subscription on the Information Kit via information expressions is different from the standard registration and subsequent search functions, described above. In addition to registering to receive the information, the agent must also provide the IK manager with the additional information that defines the request. The invention thus enables a registering of an expression-based object from a node with the information kit. Conventional methods do not include an expression object and pass only a wildcard string. The information expressions provide a richer set of options for a node on the information bus.

The IK manager notifies each registered node on the Information Kit of a positive expression matching results. With a standard subscription object, the IK manager is able to simply generate a true/false response to indicate whether the published message object is of interest to the node based on a simple comparison of the keys. However, for the more complex subscription object, additional checks are required and a response provided only when the various criteria within the expression are met. As an example, a complex query may involve utilization of logical expressions, such as AND, OR, NOT, NOR, etc. and conditional expressions IF, WHEN, etc.

A. Dictionary And Primitives

According to the illustrative embodiment, all communication within the information kit is completed via a dictionary expression composed of string keys and primitive values. The utilization of the dictionary eliminates the compile time dependencies between the code modules. Further, use of the dictionary also enables the modules to be individually replaced by any module, or combination of modules.

When a node on the information bus wants to receive notification, the node registers an expression object with the information bus. This expression object must conform to a simple interface. Notably, while the interface is simple, the implementation of this expression object can range from being very simple to very complex. By generating subscriptions utilizing an expression object instead of a wildcard string, the nodes on the information bus have a richer set of options.

SCALABILITY AND CONCLUSION

The present invention provides a mechanism for tracking object references between separately installable and replaceable modules in object oriented systems. The present invention operates in a single hardware environment, e.g., on a single computing device, rather than in a distributed data processing system environments. Also, according to the invention, the information kit comprises a combination of modules which are interchangeable (i.e., a module can be replaced by another (different) module or any combination of modules). This interchangeability is provided by allowing an agent (of each module) to be written simply for listening to the necessary information and having the agent placed on a bus where the information is published.

The invention thus extends the model of a publish-and-subscribe software bus, developed for application within large scale distributed systems under MQi, to a robust, modular arena within a single computer system. The invention overcomes the limitation of a listener pattern model by providing a model where the information is publicly available, all in one location.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention. That is, the description of the invention has been presented for purposes of illustration and description, and is not intended to be exhaustive or limited to the invention in the form disclosed. Many modifications and variations will be apparent to those of ordinary skill in the art. Particular embodiments were chosen and described in order to best explain the principles of the invention, the practical application, and to enable others of ordinary skill in the art to understand the invention for various embodiments with various modifications as are suited to the particular use contemplated.

What is claimed is:

1. In a modular computer system environment, a method comprising:

modeling publication data within a publication object that includes said publication data and an identifier (ID) indicating a type of data within said publication object, wherein said publication data is provided in a pre-established format consumable and recognizable by any one of a plurality of subscribe components of the computer system environment which has a plurality of publish components along with the plurality of subscribe components coupled to nodes of a central information bus configuration (CIBC), which enables system-wide inter-communication among the plurality of publish components and subscribe components;

receiving subscriptions from one or more of said subscribe components for said publication data;

modeling at least one of said subscriptions as a subscription object that includes a request for the particular type of data and a node ID for the node at which the subscription object is generated;

wherein, said request includes the ID of the type of data;

wherein said subscription is received from the node indicated by said node ID, and said directing of the issuance of the publication data directs the publication data to be issued to said node from which the subscription object is generated;

registering the request for said data in a registration facility of said CIBC;

comparing the ID for each publication object against the request ID in said registration facility;

signaling a match of said IDs and identifying a node for which said publication data is to be sent; and when said publication object is published on said central information bus;

placing said publication object in a queue prior to issuing said publication data to said one or more subscribing component, wherein when said publication object includes a priority value, said placing step further comprising: (a) arranging each publication object within said queue according to the priority value of each publication object; (b) when two publication objects have a same priority value, arranging said two objects according to a time of entry into said queue, wherein a first incoming object is placed within the queue ahead of a second incoming object with a same priority value, while a later received publication object with a higher priority value is placed within the queue ahead of an earlier received publication object with a lower priority value and wherein the publication data is issued from the queue in the order in which the publication object is received at the queue relative to other publication objects with the same priority value that are placed in the queue;

issuing said publication data from said queue when said publication object reaches a top of said queue, wherein when the publication object includes priority value said issuing includes issuing said publication data according to a sequential order of the publication object within the queue relative to other publication objects;

directing an issuance of said publication data to said one or more subscribe components via directed broadcast;

when said publication object includes a freshness level indicator:

determining, prior to issuing said publication data, whether said publication object is stale; and when a queued publication object is stale, dynamically triggering a publication of a more current publication object from the publish component and discarding the queued publication object;

wherein at least one of said subscribe component and said publish component is an agent that triggers an initiation and completion of a second function upon receipt of said publication data.

2. The method of claim 1, wherein said freshness level indicator is a timestamp and said method further comprises:

evaluating when the timestamp indicates the publication object was published before a prior time at which the publication object is considered stale; and initiating said determining and triggering steps to retrieve the more current publication object when the timestamp indicates the publication object is stale.

3. The method of claim 1, wherein said request within said subscription object further comprises an expression delimiter that indicates particular criteria to be met for a publication data to satisfy said request.

4. The method of claim 1, wherein said CIBC is an information kit and said publication object and subscription objects are information kit objects.

* * * * *